(12) United States Patent
Menke et al.

(10) Patent No.: US 9,936,108 B2
(45) Date of Patent: Apr. 3, 2018

(54) AUDIO AND/OR VIDEO TRANSMISSION SYSTEM

(75) Inventors: Claus Menke, Schneverdingen (DE); Sven Boetcher, Wedemark (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 643 days.

(21) Appl. No.: 13/196,407

(22) Filed: Aug. 2, 2011

(65) Prior Publication Data

US 2012/0033089 A1  Feb. 9, 2012

(30) Foreign Application Priority Data

Aug. 3, 2010  (DE) .......................... 10 2010 038 838

(51) Int. Cl.
| | | |
|---|---|---|
| *H04N 5/225* | (2006.01) | |
| *H04N 9/806* | (2006.01) | |
| *H04N 9/82* | (2006.01) | |
| *H04N 21/2187* | (2011.01) | |
| *H04N 21/242* | (2011.01) | |

(52) U.S. Cl.
CPC ............ *H04N 5/225* (2013.01); *H04N 9/806* (2013.01); *H04N 9/8205* (2013.01); *H04N 21/2187* (2013.01); *H04N 21/242* (2013.01)

(58) Field of Classification Search
USPC ............. 340/539.15; 348/158, 14.2, E5.024, 348/14.01, 500; 455/411, 41.2, 456.4; 381/92, 122
See application file for complete search history.

(56) References Cited

U.S. PATENT DOCUMENTS

| | | | |
|---|---|---|---|
| 6,055,246 A * | 4/2000 | Jones ................... | G11B 27/031 370/394 |
| 6,788,751 B1 | 9/2004 | Hustig et al. | |
| 2002/0178277 A1* | 11/2002 | Laksono ....................... 709/231 | |
| 2006/0153389 A1* | 7/2006 | Temerinac ............ H04H 20/88 381/2 | |
| 2006/0270465 A1* | 11/2006 | Lee ..................... H04M 1/7253 455/569.1 | |
| 2007/0220561 A1* | 9/2007 | Girardeau et al. .............. 725/80 | |
| 2009/0002491 A1* | 1/2009 | Haler ............................ 348/148 | |
| 2009/0222848 A1* | 9/2009 | Ramaswamy .................... 725/9 | |
| 2010/0119099 A1 | 5/2010 | Haupt et al. | |
| 2011/0249688 A1* | 10/2011 | Liu ..................... H04W 56/002 370/503 | |

FOREIGN PATENT DOCUMENTS

| | | | |
|---|---|---|---|
| DE | 10 2005 042904 | | 4/2007 |
| JP | 2007/081686 | | 3/2007 |
| JP | 2007/081686 A | * | 3/2007 |
| WO | WO 2011/023723 | | 3/2011 |

\* cited by examiner

*Primary Examiner* — Duc Nguyen
*Assistant Examiner* — Yogeshkumar Patel
(74) *Attorney, Agent, or Firm* — Haug Partners LLP

(57) ABSTRACT

There is provided an audio and/or video transmission system. That audio and/or video transmission system has a microphone unit for detecting an audio signal. The microphone unit has a first wireless transmitting unit for wirelessly transmitting an audio signal by way of a first transmission path and a second wireless transmitting unit for wirelessly transmitting the audio signal by way of a second transmission path. The second wireless transmitting unit is adapted to embed a time stamp in the audio signal to be transmitted by way of the second transmission path.

15 Claims, 1 Drawing Sheet

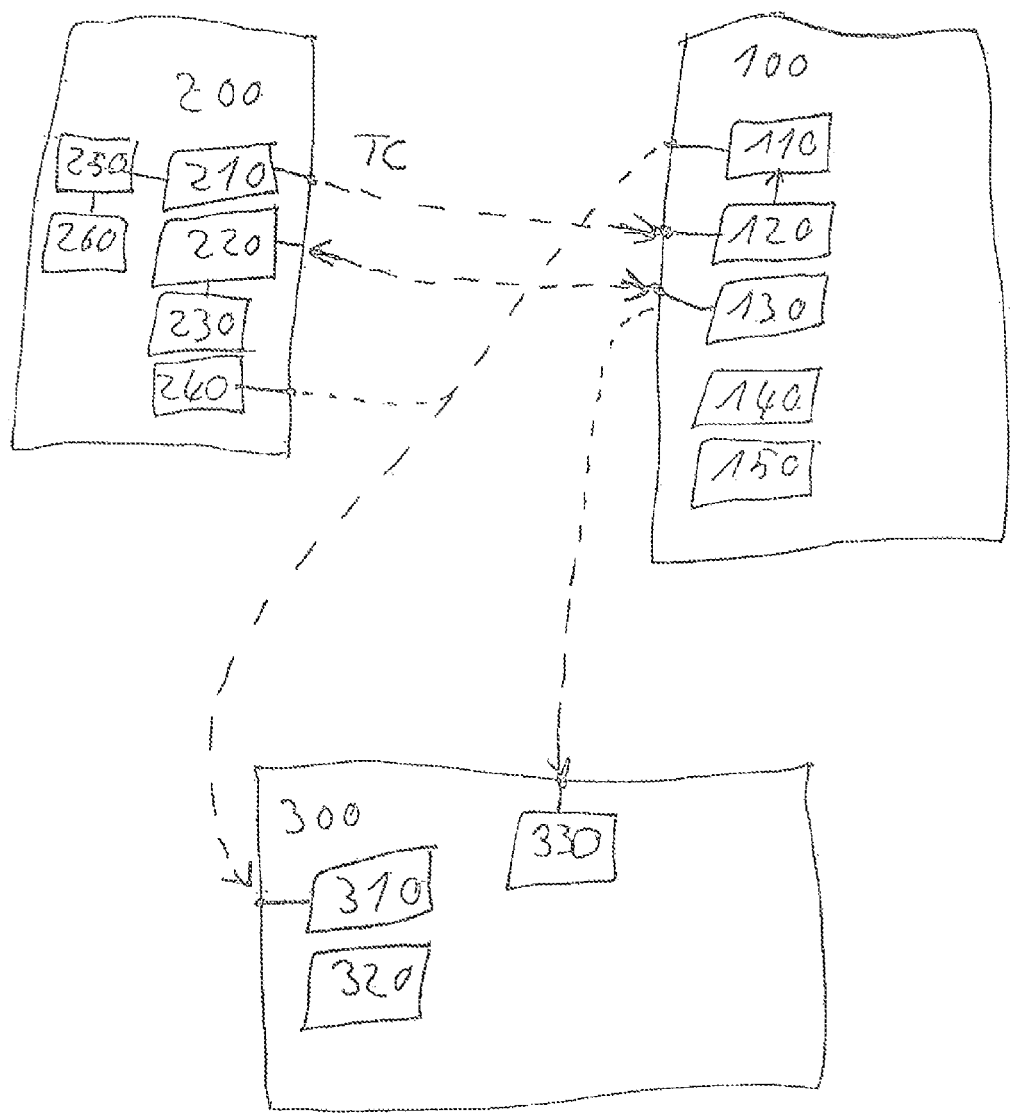

AUDIO AND/OR VIDEO TRANSMISSION SYSTEM

The present application claims priority from German Patent Application Nos. DE 10 2010 038 838.6 filed on Aug. 3, 2010, the disclosures of which are incorporated herein by reference in their entirety.

BACKGROUND OF THE INVENTION

1. Field of the Invention

The present invention concerns an audio and/or video transmission system.

2. Description of Related Art

Reports outside a television center typically involve a cameraman operating a portable video camera while a reporter uses a wired or wireless microphone. In that case the audio signals detected by the microphone are transmitted wirelessly or wired to the camera unit and stored there. Then the video signal recorded by the camera and the audio signal recorded by the microphone can be transmitted together by the camera unit. As reports with such a camera unit and such a microphone have to be carried out at different locations and under widely differing conditions it is necessary to ensure that the audio signal picked up by the microphone is reliably transmitted to the camera unit.

As general state of the art attention is directed to DE 10 2005 042 904 B4, U.S. Pat. No. 6,788,751 B1, WO 2011/023723 A1 and JP 2007081686 A.

SUMMARY OF THE INVENTION

Therefore an object of the present invention is to provide an audio and/or video transmission system which permits improved transmission of the detected audio signals.

Thus there is provided an audio and/or video transmission system. That audio and/or video transmission system has a microphone unit for detecting an audio signal. The microphone unit has a first wireless transmitting unit for wirelessly transmitting an audio signal by way of a first transmission path and a second wireless transmitting unit for wirelessly transmitting the audio signal by way of a second transmission path. The second wireless transmitting unit is adapted to embed a time stamp in the audio signal to be transmitted by way of the second transmission path.

In an aspect of the present invention the transmission system comprises a camera unit which has a first wireless receiving unit for receiving the audio signals wirelessly transmitted by way of the first transmission path and a time stamp producing unit for producing and transmitting a time stamp.

In a further aspect of the present invention the system has a central unit. The central unit has a receiving unit for receiving audio signals transmitted by way of the second transmission path and a storage means for storage of the audio signals wirelessly transmitted by way of the second transmission path.

The invention concerns the idea of providing an audio and/or video transmission system which has a camera unit for detecting and recording video signals and a separate microphone unit. The microphone unit wirelessly transmits the detected audio signals for example to the camera unit. For that purpose the microphone unit has a first transmitting unit for transmitting the detected audio signals. The microphone unit further has a second transmitting unit which also serves to transmit the recorded audio signals. The second transmitting unit can transmit the recorded audio signals in parallel to the first transmitting unit or transmission can be effected when an audio transmission from the first transmitting unit is disturbed. Provided in the camera unit is a first receiving unit for receiving the audio signals transmitted by the first transmitting unit. The camera unit also has a time stamp producing unit. The time stamps produced are synchronised with the recorded video signals and wirelessly transmitted to the microphone unit. The second transmitting unit of the microphone unit is in that respect adapted to transmit the recorded audio signal together with the time stamps from the camera unit. Thus independent audio transmission of the detected audio signals can be effected by means of the second transmitting unit so that the detected and recorded audio and video signals can afterwards be synchronised together.

The invention is based on the idea of transmitting audio data by way of a separate wireless transmission path together with a time stamp so that subsequent synchronisation of those audio signals with video signals is possible.

The invention is thus based on the idea of transmitting the audio data by way of a first wireless transmission path (for normal operation). Parallel therewith the audio signals are also transmitted by way of a second wireless transmission path in order thus to permit subsequent synchronisation of the audio signals with the recorded video signals, that is to say to permit subsequent restoration of the audio/video signals in a transmitting center. The second wireless transmission path is preferably implemented by way of a GSM, UMTS, WiFi or the like wireless network.

In an aspect of the present invention there can also be provided a central unit which can receive a receiving unit for receiving the audio signals transmitted wirelessly by the second transmitting unit of the microphone, together with the time stamp.

Those received audio signals with the time stamp can be stored in a storage means. If the video signals detected and recorded by the camera unit are also transmitted to the central unit then the video signal can be synchronised by the camera unit with the audio signal from the microphone unit which is transmitted by way of the second transmitting unit.

The second transmitting unit of the microphone unit can transmit the detected audio signals by way of a mobile radio network, by way of a wireless network (WLAN, WiFi) or the like. The first transmitting unit of the microphone unit performs wireless audio transmission preferably in the UHF band or in the ISM band.

Further configurations of the invention are subject-matter of the appendant claims.

BRIEF DESCRIPTION OF THE DRAWINGS

FIG. 1 shows a diagrammatic view of an audio and/or video transmission system according to the invention.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

FIG. 1 shows a diagrammatic view of an audio and/or video transmission system according to the invention. The audio and/or video transmission system according to a first embodiment of the invention has a microphone unit 100 and a camera unit 200. The microphone unit 100 serves to detect an audio signal and then to transmit that signal wirelessly. The camera unit 200 serves to record a video signal. The camera unit has a time stamp producing unit 210, a first receiving unit 220 and a storage means 230 optionally connected thereto for storing the audio signals received by the receiving unit 220. Optionally the camera unit 200 can have a second receiving unit 240.

The microphone unit 100 has a first transmitting unit 130 for wirelessly transmitting audio signals recorded by the microphone unit 100 by way of a first wireless transmission path and a second transmitting unit 110 for transmitting the audio signals detected by the microphone unit 100 by way of a second transmission path. The microphone unit 100 has a time stamp receiving unit 120 coupled to the second transmitting unit 110. The second transmitting unit 111 is adapted to transmit the audio signal detected by the microphone unit 100 together with the time stamps from the time stamp receiving unit 120 wirelessly by way of a second wireless transmission path. Optionally the microphone unit 100 can have an encoding unit 140 adapted to encode the audio signals to be transmitted based on various encoding processes (codec) prior to transmission by the second transmitting unit 110. According to the quality of the second wireless transmission path the corresponding encoding can be selected in the encoding unit 140. If therefore the quality of the second wireless transmission path is poor it is then possible to select an encoding process which permits greater compression. It is possible in that way to ensure that the detected audio signal can be transmitted online.

The microphone unit 100 can further have a storage means 150 in which the audio signals to be transmitted are stored together with the time code. There is thus a backup option if the second wireless transmission path should not be operating sufficiently well.

Optionally there can be provided a central unit 300 or a central server 300. The central unit 300 has a receiving unit 310 for receiving the audio signals transmitted by way of the second transmission path (together with the time stamp).

Those recorded signals can be stored in the storage means 320. Optionally there can be provided a further receiving uni 310 for receiving the audio signals transmitted by way of the first transmission path. The audio signals stored in the storage means 320 (together with the time stamp) can then be synchronised with the video signals from the camera.

The camera unit 200 further has a video unit 250 for recording a video signal. That video signal can optionally be stored in a video storage means 260. The video signal can then be extracted and can be synchronised for example with the audio signal transmitted by way of the second transmission path, with the time stamp.

The second transmission path can be provided parallel or independent of the first wireless transmission path. Audio signals can be transmitted by means of the first wireless transmission path from the microphone unit 100 to the camera unit 200. By means of the second transmission path, it is possible to provide for redundant transmission of the audio signals, which is effected for example when the first transmission path is not operating sufficiently well. The second transmission path can be based for example on a mobile radio network. In that case then the audio signals can be transmitted from the microphone unit 100 by way of the second transmission path either to the camera unit 200 or to the central unit 300 and later synchronised with the video signals from the camera unit 200. In that way the audio signals and the video signals can be transmitted by way of different transmission paths. Subsequent synchronisation can be effected by the provision of the time stamp both in the video signal by the camera unit 200 and also in the audio signal by the microphone unit 100. According to the invention the time stamp TC can be produced by the camera unit 200 and then both embedded in the video unit 250 in the recorded video signals and also wirelessly transmitted by the time stamp producing unit 210 to the microphone unit 100 where the time stamp is then embedded in the audio signal in the second transmitting unit and transmitted by way of the second transmission path.

The second transmission path can optionally also be used as a return reception path for communication purposes. A communication signal can be transmitted wirelessly from the microphone unit 100 to a wireless headphone for example by way of Bluetooth or the like.

Live reporting can be effected at any time by virtue of the provision of the second transmission path, in which case then the recorded audio signals can be synchronised afterwards with the recorded video signals.

The camera unit 200 or the microphone unit 100 respectively can optionally have a GPS receiver as well as a frequency storage means, in which case on the basis of the detected positions, from the frequency storage means, it is possible to ascertain those frequencies which are free or freed for that position. The first transmission path can then be appropriately adapted.

In a second embodiment of the invention the audio and/or video transmission system can have a microphone unit for detecting audio signals. The microphone unit has a first wireless transmitting unit 130 for the wireless transmission of an audio signal by way of a first transmission path. The microphone unit 100 further has a second wireless transmission unit 110 for wireless transmission of the audio signal by way of a second transmission path. The second wireless transmitting unit 110 is adapted to embed a time stamp in the audio signal to be transmitted by way of the second transmission path.

Optionally the transmission system can have a camera unit 300 having a receiving unit 310 for receiving audio signals transmitted by way of the second transmission path and a storage means 320 for storing the audio signals wirelessly received by way of the second transmission path.

In a third embodiment of the invention which can be based on the first or second embodiment there is provided a microphone unit 100 for detecting audio signals. The microphone unit has a wireless transmitting unit for wireless transmission of the audio signals by way of a transmission path. The transmitting unit is adapted to embed a time stamp in the audio signal to be transmitted by way of the transmission path. Optionally the transmission path can involve transmission by way of a mobile radio network, by way of a wireless network or the like.

In the third embodiment the time stamp can be produced by a camera unit or by another unit and then preferably wirelessly transmitted to the microphone unit so that it can embed the time stamp in the audio signals to be transmitted.

Subsequent synchronisation with a video signal recorded by a camera can be effected with the time stamp in the wirelessly transmitted audio signal.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. An audio and/or video transmission system, comprising:
   at least one microphone unit for detecting an audio signal; and
   a camera unit;
   wherein the microphone unit comprises:
      a first wireless transmitting unit for wirelessly transmitting the detected audio signal by way of a first transmission path to a first wireless receiving unit;
      a time stamp receiving unit adapted to receive time stamps from a time stamp producing unit; and
      a second wireless transmitting unit being different from the first wireless transmitting unit and being adapted to embed the received time stamps in the detected audio signal and wirelessly transmit the detected audio signal having said embedded time stamps by way of a second transmission path to a second receiving unit that is independent of the first receiving unit;
   wherein the camera unit includes:
      the first wireless receiving unit for receiving the detected audio signal wirelessly transmitted by way of the first transmission path from the first wireless transmitting unit; and
      the time stamp producing unit for producing and transmitting time stamps to the time stamp receiving unit of the at least one microphone unit; and
   wherein the first and second transmission paths are independent from each other.

2. The system as set forth in claim 1, further comprising:
   a central unit including:
      the second receiving unit for receiving the audio signals wirelessly transmitted by way of the second transmission path; and
      a storage means for storage of the audio signals received by the second receiving unit, wherein the received and stored audio signals comprise the time stamps.

3. A microphone unit for detecting an audio signal, comprising:
   a first wireless transmitting unit for wirelessly transmitting the detected audio signal to a camera unit by way of a first transmission path;
   a time stamp receiving unit configured to receive time stamps produced by the camera unit;
   storage means configured to record the detected audio signal together with the received time stamps; and
   a different second wireless transmitting unit for wirelessly transmitting the detected audio signal and time stamps by way of a second transmission path to a second receiving unit that is independent of the camera unit if the first transmission path is disturbed;
   wherein the second wireless transmitting unit is adapted to embed the received time stamps in the detected audio signal to be transmitted by way of the second transmission path;
   wherein, in case of failure of the second transmission path, the second wireless transmitting unit is further adapted to subsequently retransmit the recorded audio signal together with the time stamps by way of the second transmission path; and
   wherein the first and second transmission paths are independent from each other and use different frequency bands and different transmission protocols.

4. The microphone unit as set forth in claim 3;
   wherein the second transmission path represents a mobile radio transmission path.

5. An audio and/or video transmission system having a microphone unit as set forth in claim 3.

6. An audio and/or video transmission system having a microphone unit as set forth in claim 4.

7. The system as set forth in claim 1;
   wherein the microphone unit further comprises storage means for recording the detected audio signals together with the time stamps.

8. The system as set forth in claim 7;
   wherein the second wireless transmitting unit transmits recorded audio signals, together with the time stamps, when audio transmission from the first wireless transmitting unit is disturbed.

9. The system as set forth in claim 7;
   wherein the second wireless transmitting unit transmits the recorded audio signal together with the time stamps after the first wireless transmitting unit has transmitted the detected audio signal.

10. The microphone unit as set forth in claim 3;
    wherein the second wireless transmitting unit transmits the recorded audio signal together with the time stamps after the first wireless transmitting unit has transmitted the detected audio signal.

11. The system as set forth in claim 1;
    wherein the first wireless transmission path and the second wireless transmission path use different frequency bands and/or different transmission protocols.

12. The system as set forth in claim 11;
    wherein the first wireless transmission path uses the UHF or ISM band, and the second wireless transmission path uses one of WiFi, WLAN, GSM or UMTS networks.

13. The microphone unit as set forth in claim 3;
    wherein the first wireless transmission path uses the UHF or ISM band, and the second wireless transmission path uses one of WiFi, WLAN, GSM or UMTS networks.

14. The system as set forth in claim 1;
    wherein the microphone unit further comprises an encoding unit adapted for encoding or compressing audio data of the second wireless transmission path, and wherein audio data of the first wireless transmission path are not encoded or compressed.

15. The microphone unit as set forth in claim 3, further comprising
    an encoding unit adapted for encoding or compressing audio data of the second wireless transmission path, wherein audio data of the first wireless transmission path are not encoded or compressed.

* * * * *